Oct. 7, 1958  R. H. VAN SANT  2,854,776
JET PLUGGER FOR FISHING

Filed March 29, 1957  3 Sheets-Sheet 1

INVENTOR.
Robert H. Van Sant
BY
ATTORNEY

Oct. 7, 1958    R. H. VAN SANT    2,854,776
JET PLUGGER FOR FISHING
Filed March 29, 1957    3 Sheets-Sheet 2
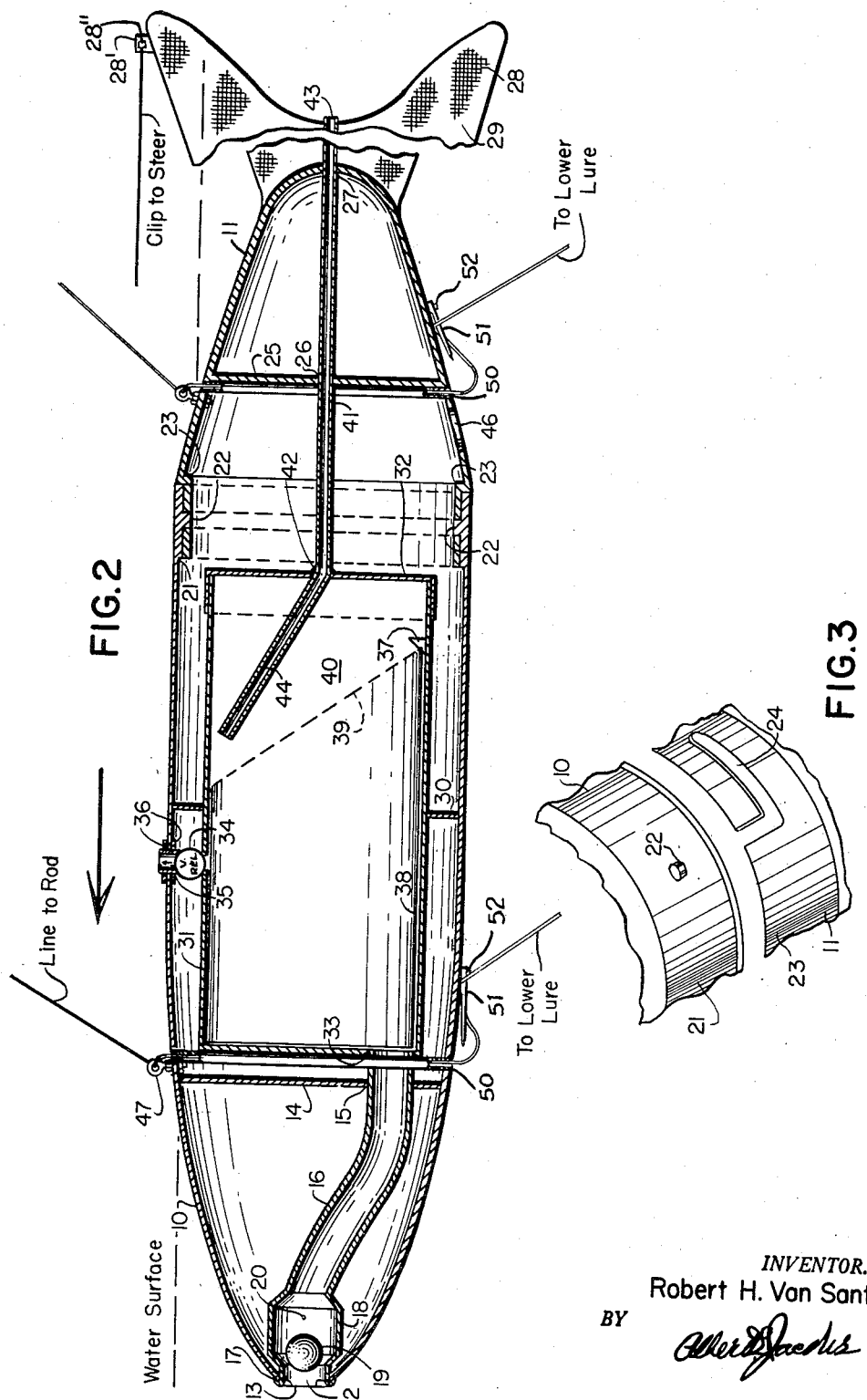
INVENTOR.
Robert H. Van Sant
BY
ATTORNEY

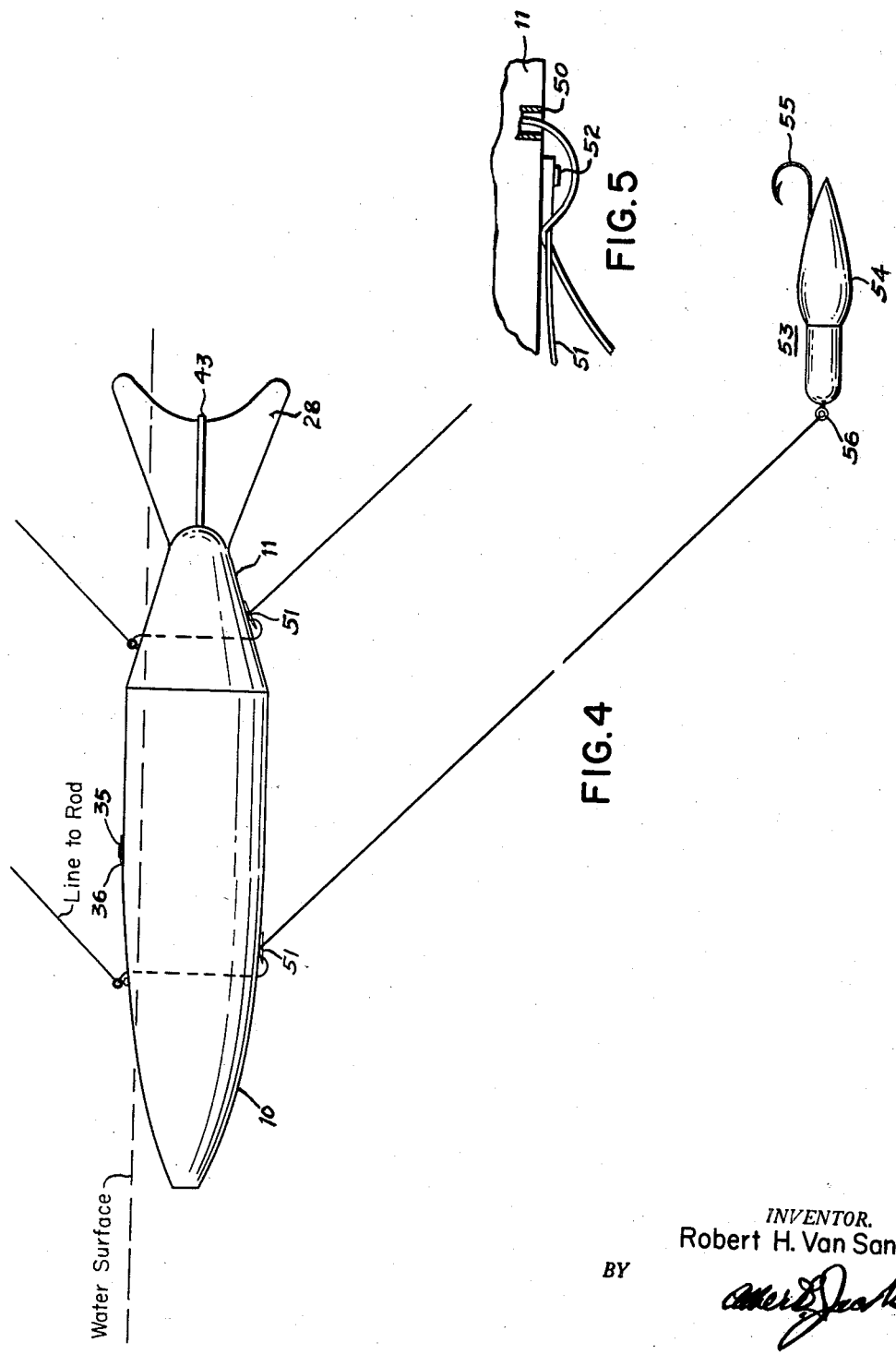

United States Patent Office 2,854,776
Patented Oct. 7, 1958

2,854,776
JET PLUGGER FOR FISHING
Robert H. Van Sant, Palm Beach, Fla.
Application March 29, 1957, Serial No. 649,440
7 Claims. (Cl. 43—26.2)

The present invention relates to a new and useful fishing lure and more particularly to a self-propelling artificial fishing lure providing a new type of fishing and which may be used for simultaneous 2-level fishing.

Artificial fishing lures of many different types, including some which oscillate, are known but, so far as I am aware, there is no known or available artificial fishing lure which is capable of self-propulsion at considerable speed and for considerable distances and which is also capable of being used for 2-level fishing.

One of the objects of this invention is to provide for the first time a jet plugger for use in a novel type of fishing, said plugger being self-propelling and capable of traveling for a considerable distance at a relatively high rate of speed and of being directionally controllable.

Another object of the invention resides in a jet plugger for use in fishing which is specially constructed to make it self-propelling and controllable and for simultaneous 2-level fishing.

A still further object of the invention is to provide an artificial fishing lure which is unusually attractive to game fish and which renders more versatile the art of fishing for game fish.

Other and further objects and advantages will be pointed out hereinafter or will be understood by those skilled in this art.

In the accompanying drawing,

Fig. 2 is a longitudinal sectional elevation taken through Fig. 1;

Fig. 3 is a fragmentary perspective view showing details of the pin locking device employed to enable the plugger to be assembled and disassembled and the supply of propellant renewed;

Fig. 4 is a diagrammatic side elevational view of my new jet plugger as used for 2-level fishing; and Fig. 5 is a fragmentary detail view showing how the fishing line is held by a spring clip.

Figure 1:
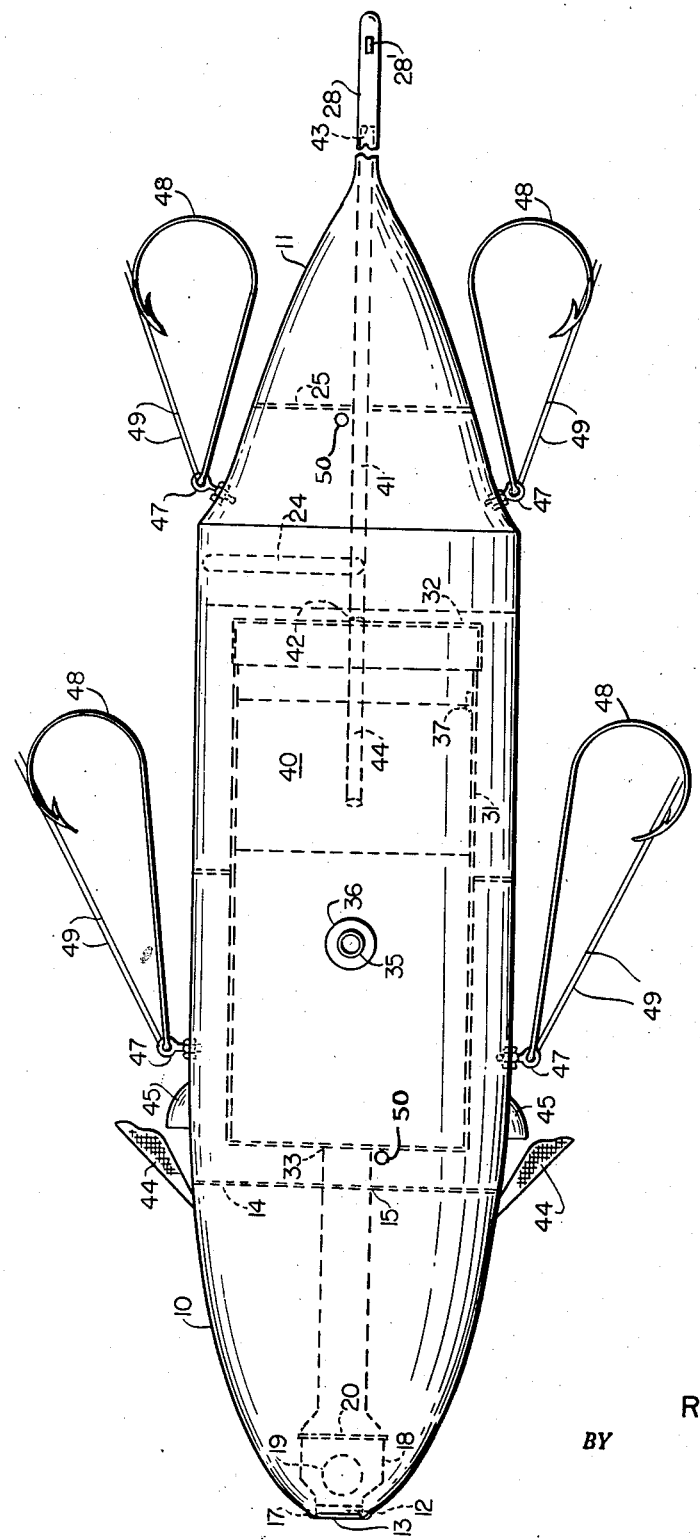
Fig. 1 is a plan view of a jet plugger constructed in accordance with a preferred embodiment of the invention.

Referring now to the drawing in detail, it will be observed that the new jet plugger is pisciform, i. e., is constructed to have the external configuration of a fish, such as a mullet. The jet plugger comprises a front case 10 and a rear case 11, each of which is in the form of a thin shell preferably composed of a synthetic plastic such as butyrate resin, but thin gauge aluminum has been found to be fully satisfactory. The front case 10 extends for a major proportion of the length of the plugger and is provided at its forward rounded end with an aperture 12 covered by a disk-shaped fine mesh screen 13 held in place in any suitable or known manner as by spring means and readily removable for cleaning. This screen filters out all particles or objects which might clog the plugger and interfere with its proper operation.

The front case is maintained in shape and strengthened by means of a front transverse diaphragm 14, preferably, but not necessarily, composed of a thin disk of aluminum and wedged in place or secured in the front case. This front diaphragm is provided with an opening 15 near its lower side, as shown in Fig. 2, for the passage of water tube 16, the forward end of which is inserted in the opening 12 at the forward end of the front case and crimped over the edge thereof, as shown at 17. Just rearwardly of the forward portion of the front case, water tube 16 is provided with an enlargement 18 within which is disposed a ball valve 19 of such size that, as will be hereinafter explained, it is capable of closing the opening 12 when sufficient pressure for that purpose has been developed within the plugger. The enlargement of the water tube 16 is also provided with a pin stop 20, mounted across the enlargement, for limiting rearward movement of ball valve 19 and thus preventing the water tube from becoming shut off from communication with sea or lake water, in which the plugger is used. At its rear end, the front case is provided with an annular, thickened portion, either continuous or discontinuous, with one or more pins 22 projecting therefrom.

Rear case 11 of generally parabolic shape is provided at its forward end with an offset 23 having one or more bayonet or other type slots 24 by means of which the rear case can be readily assembled with and disassembled from the front case. The rear case, similarly to the front case, is made of synthetic plastic or aluminum and is likewise provided with a diaphragm 25 of aluminum or other suitable material. The diaphragm of the rear case has a central opening 26 therethrough for a purpose to be explained. There is also an aperture 27 in the rearward end of the rear case through which the jet tube (to be described) passes and to which it is sealed, and secured to and extending from the rearward end of the rear case is a fishtail portion 28 which is preferably composed of plastic material having wire mesh 29 embedded or molded therein so that the tail is adapted to be bent into different positions for purposes to be explained. Tail portion 28 is provided with a clip or lug 28' for a purpose explained below.

The front case is also provided with an intermediate, inwardly extending annular flange 30 and located within the front case is a cylindrical pressure vessel 31 composed of a cylindrical body portion closed at its front end and open at its rear end, the rear end being provided with a removable cap 32. Flange 30 maintains vessel 31 in spaced relation to front case 10 but in a non-watertight manner. It will be observed that the pressure vessel 31 is located in the central portion of the plugger and extends from a point spaced slightly rearwardly of diaphragm 14 to a point just forwardly of the pin lock arrangement above described. The forward closed end of the pressure vessel is, however, provided with an opening 33 for the reception of the rearward end of water tube 16, thus giving communication between the water outside the plugger and the interior of the pressure vessel. The pressure vessel is also provided with a relief valve 34 disposed in a tube 35 connecting the interior of the pressure vessel with the outside atmosphere and the upper end of which tube is suitably mounted in the front case, such as by lock washers 36. A knife 37 is provided, as shown, within the pressure vessel and projects radially inwardly from the wall thereof. The propellant, which is calcium carbide, usually in the form of pellets or granules, is enclosed within a waterproof covering membrane 38 and extends from the closed front of the pressure vessel to the broken line 39, thereby leaving a space 40 within which pressure is developed. It will be noted that the arrangement is such that, when the carbide propellant is inserted into the pressure vessel (while cap 32 is off), the covering membrane is slit or opened by the knife 37, thereby providing access to the carbide for water entering the pressure vessel through water tube 16 and enabling the water to come into contact with the carbide, thus generating acetylene gas. The cap 32 of the pressure vessel has a central opening around which the forward end of jet tube 41 is welded at 42, the said jet tube extending axially rearwardly through diaphragm 25, through the rearward end of the rear case and along or through the tail portion 28, terminating in a jet port 43 in the concavity of the tail portion as shown. Jet tube 41 also has a forward extension 44 which is angularly upwardly disposed in space 40 so that it terminates a little below the upper side of the pressure vessel and in a position to receive the acetylene gas generated by the contact of water with the calcium carbide without however receiving water.

It is known that calcium carbide generating acetylene gas from contact with water in an enclosure is capable of developing gas pressure to the extent of approximately 50 p. s. i., and the construction illustrated and described is capable of withstanding such a pressure, but it has been found that this maximum pressure is not ordinarily required for the purposes of the invention, and hence gas pressure within the pressure vessel is not normally allowed to exceed 15 p. s. i. By providing the relief valve 34 which may, for example, be a spring-loaded pressure relief valve of well-known type with a spring-load equivalent to 15 p. s. i., it will be clear that, whenever the pressure within the pressure vessel exceeds 15 p. s. i., the relief valve will open and bleed off excess pressure. When the pressure is below 15 p. s. i., the relief valve will stay closed and also initially until the pressure developed within the pressure vessel exceeds 15 p. s. i.

It will be noted from Fig. 1 that the front case is provided on its exterior with dorsal fins 44, which may be changed in their relative positions for steering purposes in conjunction with tail portion manipulations, these fins being of any suitable material or combination of materials, such as that of the tail portion itself and secured at one end in any suitable manner to the front case. Just rearwardly of the dorsal fins, the front case is also externally provided with the cooling water scoops 45 which are mounted over suitable openings in the shell of the front case a little rearwardly of the forward diaphragm 14, so that these cooling water scoops direct water into the annular space between the pressure vessel and the shell of the front case and past or through flange 30, which is scalloped along its inner edge or perforated for such purpose, thus preventing the pressure vessel from becoming overheated. This cooling water, therefore, flows into the central portion of the plugger and constitutes it a water chamber, water escaping therefrom through the cooling water outlet 46 in the belly portion of the plugger just forwardly of the rear diaphragm 25. The space within the front case forwardly of diaphragm 14 and around the water tube is an air space, and the same is true of the space between the diaphragm 25 of the rear case and the rearward rounded end of the rear case, these air spaces being so proportioned with respect to the over-all size of the plugger as to provide buoyancy.

The front and rear cases are additionally provided with a plurality of appropriately disposed swivel eyebolts 47 for the passage therethrough of the fishing line and as mountings for fish hooks 48 which are preferably of the weedless type wherein a pair of wires 49 extends from the eye-bolt across the barb of the hook to prevent weeds from clogging the hooks. The rear case is similarly provided with two or more swivel eyebolts and weedless hooks. It is to be understood that the eye-bolts and hooks may be of any desired number, size and spacing depending upon the size of any given plugger and the kind of fish to be fished for.

From Figs. 1 and 2 it will be observed that there is a tube 50 extending from top to bottom through the jet plugger adjacent and inwardly of each of the members 14 and 25 in order that a fishing line may pass therethrough to the underside of the jet plugger and that such tubes define passageways through which the fishing line can be readily threaded or passed. It will further be observed from Figs. 2, 4, and 5 that the underside of the jet plugger is provided with a stainless steel spring clip just rearwardly of each of the passageways aforesaid. Each of these stainless steel spring clips is made up of a strip of springy material 51, preferably ¼" wide and ¾" long, one end of which is secured to the jet plugger by any suitable fastening instrumentality indicated at 52. These passageways through the jet plugger do not in any way adversely affect the operation and use of the jet plugger and provide for the fishing line to extend therethrough around the spring clips and 20 to 30 feet below the jet plugger where they are connected to a lower lure 53 (Fig. 4) which may be of any suitable or desired nature depending upon the type of fishing involved. Such a lower lure, for example, is made up of a rotatable body member 54 having one or more hooks 55 attached thereto and provided at one end with a swivel 56, the eye of which is adapted to receive and have tied thereto the end of the fishing line. The construction is such, as will be more fully appreciated from the diagrammatic representation of Fig. 4, that great versatility is provided for fishing on two levels simultaneously, this having been found by me to be novel and highly advantageous and to constitute a new type of fishing. The passage of the fishing line around the spring clip is understood to be of a temporary nature because, when a "strike" is made, the weight and activity of the game fish cause the fishing line to become disengaged from the spring clip by the flexing of strip 51 so that the fish may be "played" as required. It will further be understood that while either or both of the spring clips may be used usually only one is used at any one time. Depending upon whether the jet forward or the rearward spring clip is employed, the jet plugger as a whole is adapted to be used either at or near the surface of the water or is caused to dive so that it can be used at some distance below the surface of the water. Any suitable natural or artificial bait is used on the various hooks depending upon the particular kind of fishing which is to be carried out at any given time. In addition, the fisherman will have a supply of blood tablets for release in the cooling water chamber so that blood tinged water passes out of outlet port 46 for attracting certain kinds of game fish.

When the fisherman wants the plugger to dive for deep water fishing, the front tube and spring clip are used. When launching the jet plugger from a boat, for example, the fishing line is run to the tail and clipped with Scotch tape 28" (see Fig. 2) provided by the fisherman to ensure initial direction of launching. This tape or its adhesive is water-soluble and soon releases the line to its traveling position at the upper forward eyebolt and swivel 47. As water passes through water tube 16 and enters the pressure vessel 31, reaction with the calcium carbide starts and proceeds rapidly to generate acetylene. As soon as the pressure rises in the pressure vessel, ball valve 19 moves forwardly to close the screened opening 12, thus preventing further ingress of water. Relief valve 34 prevents the pressure from materially exceeding 15 p. s. i., although the pressure vessel is capable of withstanding a pressure of 50 p. s. i. to meet underwriter's requirements. When the relief valve opens, expelled gas creates a stream of bubbles attractive to fish, it being noted that acetylene gas has no off-odor objectionable to fish. A 3-ounce charge of calcium carbide is sufficient to propel the jet plugger at a speed of 300 to 400 feet per minute for a distance of 600 feet in smooth water. This distance plus return plugging makes a traverse of 1,000 to 1,200 feet with each charge of carbide. Refills cost no more than live bait. However, when the tail is partially bent to right or left, the jet plugger will travel in a large circle and return toward the boat or shore, as may be desired. Thus, a new and exciting kind of sport and game fishing is made possible either in salt water or in fresh water. If the gas charge becomes exhausted with the jet plugger out in the water, it may then be plugged back manually to shore or to the boat. Each pound of calcium carbide yields 4.5 cubic feet of acetylene gas when using pieces of ¼" x ½". Approximately 1 gallon of water is needed for each pound of carbide. A heat rise of 93° F. occurs when 1 pound of carbide reacts with 1 gallon of water. Substantially complete reaction takes place within a very few minutes, about 85 to 90% being completed in about 1 minute.

The jet plugger is illustrated in the drawings as full size, i. e., on a 1:1 scale. In this connection it has been found that the proportions are critical since otherwise weight, size and buoyancy are not properly correlated to obtain operation. I am, however, not limited to this one size of plugger because larger and smaller sizes are entirely feasible provided that appropriate proportional relationships are maintained with especial reference to weight and buoyancy. It will be appreciated, furthermore, that the hook size, style and arrangement will, in accordance with recognized practices, take into account the kind of fish to be fished for, whether tarpon, sailfish, marlin, striped bass, channel bass, bluefish, snook, fresh-water muskelonge, bass, pike, pickerel, trout, etc. Typical hooks used are 7–0. Typical swivels are "bead chain" and "snaps," these permitting ready change or replacement of hooks. The plugger has also been found to be most effective with monofilament line, preferably on a spinning reel to reduce drag as much as possible.

The foregoing is intended as illustrative and not as limitative since, within the terms of the appended claims, various modifications may be made without departing from the invention. It has been found, for example, that spring clips 51 are equally satisfactory when they are reversed, i. e., when they face the tail of the pisciform shell, and such reversal is a part of this invention.

I claim:

1. A jet plugger comprising a hollow pisciform shell having a screened water intake opening at its forward end and a jet tube opening at its rearward end, a first transverse diaphragm mounted in the shell near the forward end thereof to form with said shell a forward buoyant air compartment, a second transverse diaphragm mounted in the shell near the rearward end thereof to form with said shell a rearward buoyant air compartment, a cylindrical pressure vessel mounted longitudinally in said shell between said diaphragms but spaced therefrom and from said shell to form a water cooling compartment with water inlet and outlet openings in said shell rearwardly of said first diaphragm and forwardly of said second diaphragm, respectively, said pressure vessel being closed at its forward end and provided with a removable cap at its rearward end, a water tube extending from the screened intake opening at the forward end of the shell through said first diaphragm to an opening in the closed forward end of the pressure vessel to supply water to said pressure vessel, said water tube having an enlargement near its forward end, a ball valve in said enlargement of sufficient size to close said screened water intake opening in response to gas pressure developed in said pressure vessel, a pin stop in said enlargement to limit rearward movement of said valve and to prevent blockage of said water tube by said ball valve, pieces of calcium carbide enclosed in a water-proof membrane filling a portion of said pressure vessel and insertable therein through the capped end of said pressure vessel, a knife mounted in the pressure vessel which cuts said membrane when it is inserted, a pressure limiting valve for said pressure shell which opens when pressure in said pressure vessel exceeds a predetermined value and which while open permits pressure gas developed in said pressure vessel by chemical reaction of water and calcium carbide to form a stream of bubbles during the time the plugger is submerged, a jet tube extending from the rearward portion of the interior of the pressure vessel through the removable cap of the pressure vessel, through said second diaphragm and through the jet tube opening at the rearward end of said shell to the concavity of a fish-tail rearward extension of said shell, and eye-bolt swivels mounted in said shell for attaching said shell to a fishing line and for securing hooks and bait thereto.

2. A jet plugger in accordance with claim 1, in which a tube extends from top to bottom thereof adjacent and inwardly of each of the said transverse diaphragms and the jet plugger is provided on its underside with a spring clip rearwardly of each of the tubes, whereby a fishing line may extend through and fishing can be carried out on two levels simultaneously.

3. A jet plugger comprising a hollow pisciform shell having a screened water intake opening at its forward end and a jet tube opening at its rearward end, a first transverse diaphragm mounted in the shell near the forward end thereof to form with said shell a forward buoyant air compartment, a second transverse diaphragm mounted in the shell near the rearward end thereof to form with said shell a rearward buoyant air compartment, a cylindrical pressure vessel mounted longitudinally in said shell between said diaphragms but spaced therefrom and from said shell to form a water cooling compartment with water inlet and outlet openings in said shell rearwardly of said first diaphragm and forwardly of said second diaphragm, respectively, said pressure vessel being closed at its forward end and provided with a removable cap at its rearward end, a water tube extending from the screened intake opening at the forward end of the shell through said first diaphragm to an opening in the closed forward end of the pressure vessel to supply water to said pressure vessel, said water tube having an enlargement near its forward end, a ball valve in said enlargement of sufficient size to close said screened water intake opening in response to gas pressure developed in said pressure vessel, a pin stop in said enlargement to limit rearward movement of said valve and to prevent blockage of said water tube by said ball valve, pieces of calcium carbide enclosed in a water-proof membrane filling a portion of said pressure vessel and insertable therein through the capped end of said pressure vessel, a knife mounted in the pressure vessel which cuts said membrane when it is inserted, a pressure limiting valve for said pressure shell which opens when pressure in said pressure vessel exceeds a predetermined value and which while open permits pressure gas developed in said pressure vessel by chemical reaction of water and calcium carbide to form a stream of bubbles during the time the plugger is submerged, a jet tube extending from the rearward portion of the interior of the pressure vessel through the removable cap of the pressure vessel, through said second diaphragm and through the jet tube opening at the rearward end of said shell to the concavity of a fish-tail rearward extension of said shell, and eye-bolt swivels mounted in said shell for attaching said shell to a fishing line and for securing hooks and bait thereto, said fish-tail rearward extension of said shell being of wire mesh in plastic and serving as a rudder, and said shell being exteriorly provided with dorsal steering fins just forwardly of said first diaphragm.

4. A jet plugger in accordance with claim 3, in which a tube extends from top to bottom thereof adjacent and inwardly of each of the said transverse diaphragms and the jet plugger is provided on its underside with a spring clip rearwardly of each of the tubes, whereby a fishing line may extend through and fishing can be carried out on two levels simultaneously.

5. A jet plugger comprising a hollow shell, a transverse interior diaphragm near each end of the shell to provide fore and aft buoyant air compartments, a pressure vessel mounted in said shell between said diaphragms, a gas-forming propellant in said pressure vessel which generates gas upon contact with water, means for contacting said propellant with incoming water for gas-forming purposes and for stopping flow of incoming water when gas pressure in said pressure vessel attains a predetermined value, means for discharging formed gas from said pressure vessel and through the rearward end of said shell for propelling said shell, means for cooling said pressure vessel by water through which the shell is propelled, and means for guiding the path of travel of the propelled shell, a tube extending from top to bottom thereof adjacent and inwardly of each of the said transverse diaphragms and the jet plugger being provided on its underside with a spring clip rearwardly of each of the tubes, whereby a fishing line may extend through and fishing can be carried out on two levels simultaneously.

6. A jet plugger comprising a hollow shell, a transverse interior diaphragm near each end of the shell to provide fore and aft buoyant air compartments, a pressure vesesl mounted in said shell between said diaphragms, a water tube affording communication between an opening in the forward end of said shell and an opening in the forward end of said pressure vessel, a gas-forming propellant in said pressure vessel, a jet tube extending from within said pressure vessel to and through the rearward end of said shell, a pressure venting tube extending radially from said pressure vessel through said shell, a relief valve in said vent tube for limiting maximum pressure in said pressure vessel, a pressure-responsive ball valve in said water tube and a limiting stop in said water tube for restricting rearward movement of said ball valve, a tube extending from top to bottom thereof adjacent and inwardly of each of the said transverse diaphragms and the jet plugger being provided on its underside with a spring clip rearwardly of each of the tubes, whereby a fishing line may extend through and fishing can be carried out on two levels simultaneously.

7. A jet plugger for fishing comprising a thin pisciform shell, a transverse diaphragm in said shell near each end thereof forming a buoyant air compartment fore and aft, a cylindrical pressure vessel mounted longitudinally within and spaced from said shell between said diaphragms, a propellant in said vessel which when contacted by water develops gas pressure in said vessel, means for admitting a limited amount of water into said vessel through an opening in its forward end, means for water cooling said vessel and means for discharging pressure gas from said shell at its rearward end for propelling the same, a tube extending from top to bottom thereof adjacent and inwardly of each of the said transverse diaphragms and the jet plugger being provided on its underside with a spring clip rearwardly of each of the tubes, whereby a fishing line may extend through and fishing can be carried out on two levels simultaneously.

References Cited in the file of this patent
UNITED STATES PATENTS

| | | |
|---|---|---|
| 1,244,948 | Brown | Oct. 30, 1917 |
| 2,089,888 | Garrett | Aug. 10, 1937 |
| 2,320,145 | La Due | May 25, 1943 |